United States Patent
Oh et al.

(10) Patent No.: US 7,876,018 B2
(45) Date of Patent: Jan. 25, 2011

(54) SYNCHRONOUS RELUCTANCE MOTOR AND COMPRESSOR HAVING THE SAME

(75) Inventors: Jae-Yoon Oh, Gyeonggi-Do (KR); Kyung-Hoon Lee, Seoul (KR); June-Hee Won, Seoul (KR); Gil-Su Lee, Seoul (KR); Hyun-Hun Shin, Seoul (KR); Dal-Ho Cheong, Seoul (KR); Jun-Ho Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 11/555,325
(22) Filed: Nov. 1, 2006

(65) Prior Publication Data

US 2007/0120434 A1    May 31, 2007

(30) Foreign Application Priority Data

Nov. 30, 2005    (KR) ...................... 10-2005-0116034

(51) Int. Cl.
*H02K 21/12*    (2006.01)
*H02K 1/06*    (2006.01)
*H02K 1/22*    (2006.01)
*H02K 21/00*    (2006.01)
*H02K 1/00*    (2006.01)
*H02K 1/32*    (2006.01)

(52) U.S. Cl. .................... 310/261.1; 310/114; 310/162; 310/168; 310/156.57; 310/216.014; 310/216.015; 310/216.106; 310/216.107; 310/216.108; 417/44.1; 417/410.1; 417/415

(58) Field of Classification Search .................. 310/261, 310/42, 156, 217, 218, 162, 156.57, 216.008, 310/216.015, 216.016, 216.071, 216.072, 310/216.073, 216.108, 261.1, 216.004, 216.106, 310/216.107, 114, 168; 336/210, 216, 233, 336/211, 212, 213, 217, 218, 219; 417/415, 417/44.1, 410.1; *H02K 1/22, 21/00, 21/12, H02K 1/00, 1/06, 1/32, 9/00; H01F 27/26, H01F 27/245, 27/24; F04B 35/04*

See application file for complete search history.

(56) References Cited

U.S. PATENT DOCUMENTS 5,354,185 A    10/1994    Morinigo et al.

(Continued)

FOREIGN PATENT DOCUMENTS

CN    1158741    9/1997

(Continued)

OTHER PUBLICATIONS

English language Abstract of KR 10-0239979.

(Continued)

*Primary Examiner*—Quyen Leung
*Assistant Examiner*—Michael Andrews
(74) *Attorney, Agent, or Firm*—KED & Associates LLP (57) ABSTRACT

A synchronous reluctance motor comprises a stator and a rotor, the rotor comprising: a rotation shaft; a first core having a shaft hole for inserting the rotation shaft at a center thereof, and having a plurality of first flux barrier groups arranged along a circumferential direction of the shaft hole and spacing from each other; and a second core having a receiving hole larger than the shaft hole at a center thereof, and stacked at one side of the first core in an axial line direction. A length of the rotor protruding from a supporting portion can be decreased without reducing a stacked thickness thereof, and a vibration occurrence in a horizontal direction with respect to the rotation shaft can be reduced, thereby enhancing a reliability of the synchronous reluctance motor.

28 Claims, 5 Drawing Sheets

U.S. PATENT DOCUMENTS

| | | | |
|---|---|---|---|
| 5,666,015 A * | 9/1997 | Uchibori et al. | 310/156.53 |
| 6,218,753 B1 * | 4/2001 | Asano et al. | 310/156.53 |
| 6,239,526 B1 * | 5/2001 | Oh et al. | 310/162 |
| 6,259,181 B1 * | 7/2001 | Kawano et al. | 310/216.059 |
| 6,300,703 B1 * | 10/2001 | Kawano et al. | 310/216.004 |
| 6,508,636 B2 * | 1/2003 | Ogawa et al. | 417/410.3 |
| 6,547,538 B1 | 4/2003 | Tamura et al. | |
| 6,769,167 B2 * | 8/2004 | Lee et al. | 310/216.106 |
| 6,798,104 B2 * | 9/2004 | Kajiura et al. | 310/162 |
| 6,906,448 B2 * | 6/2005 | Yoshino et al. | 310/216.094 |
| 7,102,309 B2 | 9/2006 | Oh et al. | |
| 2003/0020351 A1 * | 1/2003 | Lee et al. | 310/156.53 |
| 2003/0090170 A1 * | 5/2003 | Yoshino et al. | 310/261 |
| 2003/0111927 A1 * | 6/2003 | Takita et al. | 310/216 |
| 2003/0184185 A1 * | 10/2003 | Yoshino et al. | 310/261 |
| 2004/0191094 A1 * | 9/2004 | Kojima et al. | 417/415 |
| 2006/0147326 A1 * | 7/2006 | Kakiuchi et al. | 417/415 |
| 2006/0284512 A1 | 12/2006 | Lee et al. | |

FOREIGN PATENT DOCUMENTS

| | | |
|---|---|---|
| CN | 1179126 | 5/1998 |
| CN | 1419331 | 5/2003 |
| DE | 1513757 | 7/1969 |
| EP | 1111240 | 6/2001 |
| JP | 2003-193973 | 7/2003 |
| KR | 100239979 | 10/1999 |

OTHER PUBLICATIONS

English language Abstract of JP 2003-193973.
Chinese Office Action dated Apr. 24, 2009.

* cited by examiner

SYNCHRONOUS RELUCTANCE MOTOR AND COMPRESSOR HAVING THE SAME

RELATED APPLICATION

The present disclosure relates to subject matter contained in priority Korean Application No. 10-2005-0116034, filed on Nov. 30, 2005, which is herein expressly incorporated by reference in its entirety.

BACKGROUND OF THE INVENTION

1. Field of the Invention

The present invention relates to a synchronous reluctance motor and a compressor having the same, and more particularly, to a synchronous reluctance motor capable of enhancing a reliability thereof when rotated by decreasing a length in an axial line direction extending from a supporting portion without reducing a stacked thickness in the axial line direction, and a compressor having the same.

2. Description of the Background Art

A synchronous reluctance motor is rotated in a synchronous speed by a reluctance torque due to an inductance difference between a D-axis inductance and a Q-axis inductance. The synchronous reluctance motor is being increasingly used owing to a low fabrication cost, a high reliability, and a permanent lifespan thereof.

Figure 1:
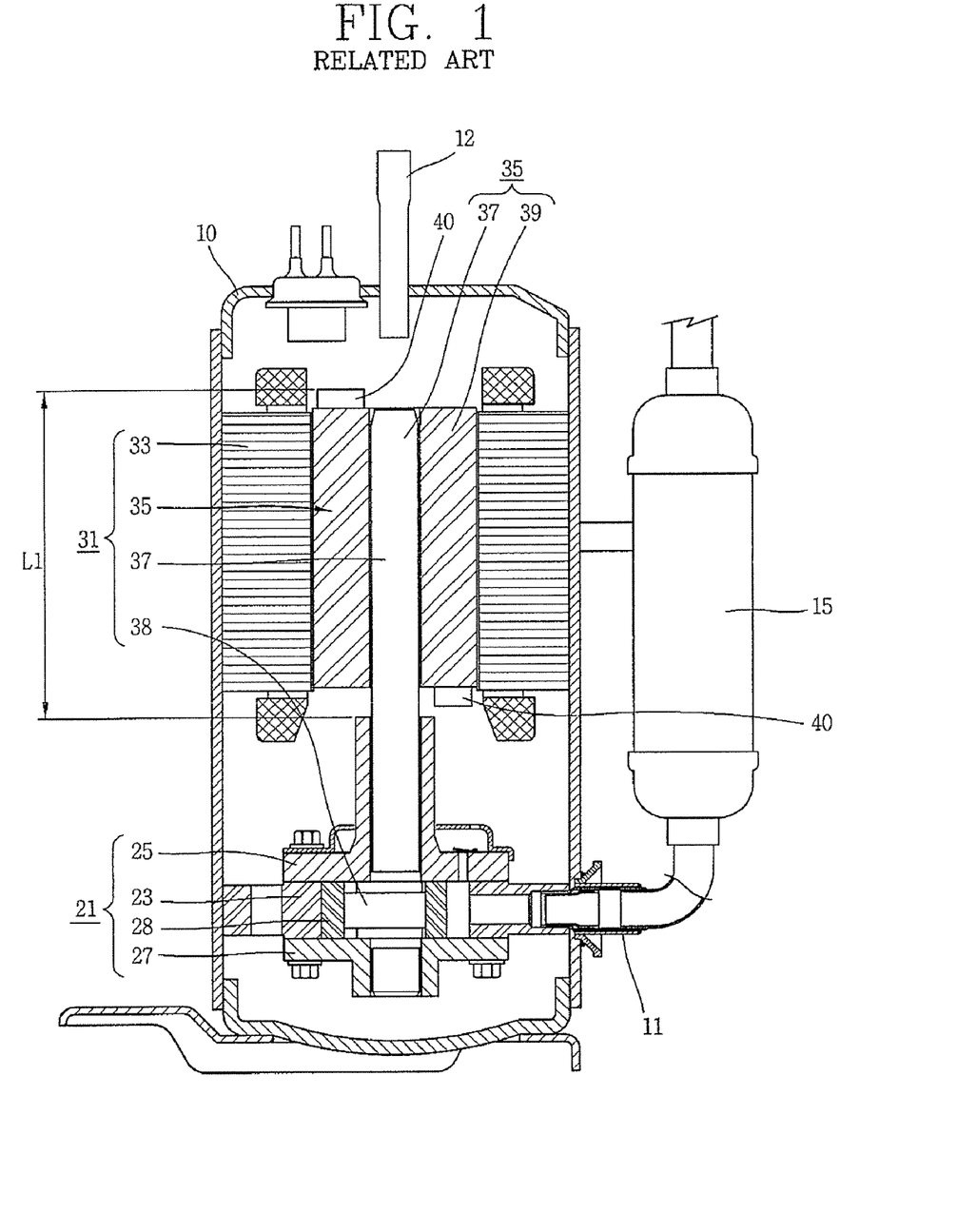
FIG. 1 is a longitudinal section view showing a hermetic compressor in accordance with the related art.

As shown in FIG. 1, a hermetic compressor comprises: a case 10 having a hermetic receiving space therein, a compression unit 21 installed in the case 10 for compressing a fluid such as a refrigerant, etc.; and an electric motor 31 having a rotation shaft 37 connected to the compression unit 21, for providing a driving force to the compression unit 21.

A suction pipe 11 for sucking a fluid and a discharge pipe 12 for discharging a compressed fluid are coupled the case 10, respectively. An accumulator 15 for sucking a fluid of a gaseous state is connected to the suction pipe 11.

The compression unit 21 comprises a cylinder 23 having a compression space therein; an upper bearing member 25 and a lower bearing member 27 coupled to an upper surface and a lower surface of the cylinder 23, respectively, for rotatably-supporting the rotation shaft 37; and a roller 29 arranged in the cylinder 23 so as to be eccentrically-movable, for compressing a refrigerant.

The electric motor 31 comprises a stator 33 fixed to inside of the case 10, and a rotor 35 arranged so as to be rotatable with respect to the stator 33. The rotor 35 comprises a rotation shaft 37 having an eccentric portion 38 at a lower portion thereof; and a rotor core 39 rotatably coupled to the rotation shaft 37. The eccentric portion 38 serves to eccentric-movably couple the roller 29. A balance weight 40 is respectively coupled to an upper end and a lower end of the rotor 35.

However, in the related art hermetic compressor, the electric motor 31 is arranged at an upper side of the compression unit 21, and a lower portion of the rotation shaft 37 is supported by the upper bearing member 25 and the lower bearing member 27. Accordingly, the length L1 extending from the upper end of the upper bearing member 25 along the axial line direction is increased. As the result, the upper portion of the rotor 35 spaced from the upper bearing member 25 is much vibrated in a horizontal direction with respect to the axial line, and it is difficult to obtain the reliability of the motor when the rotor is rotated in a high speed. Especially, in case of a synchronous reluctance motor having a stacked thickness of the rotor 35 increased than that of an induction motor or a BLDG motor, the length L1 extending from the upper end of the upper bearing member 25 along the axial line direction is increased. Accordingly, it becomes more difficult to obtain the reliability of the synchronous reluctance motor.

SUMMARY OF THE INVENTION

Therefore, an object of the present invention is to provide a synchronous reluctance motor capable of enhancing a reliability thereof when rotated by decreasing a length in an axial line direction extending from a supporting portion without reducing a stacked thickness in the axial line direction, and a compressor having the same.

To achieve these and other advantages and in accordance with the purpose of the present invention, as embodied and broadly described herein, there is provided a synchronous reluctance motor, comprising: a stator; and a rotor, wherein the rotor comprises a rotation shaft; a first core having a shaft hole for inserting the rotation shaft at a center thereof, and having a plurality of first flux barrier groups arranged in a circumferential direction of the shaft hole and spacing from each other; and a second core stacked at one side of the first core in an axial line direction, and having a receiving hole larger than the shaft hole at a center thereof.

According to another embodiment of the present invention, the synchronous reluctance motor comprises a stator and a rotor, wherein the rotor comprises a rotation shaft; a first core having a shaft hole for inserting the rotation shaft at a center thereof, and having a plurality of first flux barrier groups arranged in a circumferential direction of the shaft hole and spacing from each other; and a second core having a receiving hole larger than the shaft hole at a center thereof, having a plurality of second flux barrier groups arranged in a circumferential direction of the receiving hole and spacing from each other, and stacked at one side of the first core in an axial line direction, wherein the first flux barrier group includes first to third slots arranged from a circumference of the first core towards the shaft hole with a gap therebetween.

To achieve these and other advantages and in accordance with the purpose of the present invention, as embodied and broadly described herein, there is also provided a compressor having the synchronous reluctance motor, comprising: a case; a compression unit received in the case for compressing a fluid; and a synchronous reluctance motor having a stator and a rotor rotatably coupled to the stator, wherein the rotor comprises a rotation shaft; a first core having a shaft hole for inserting the rotation shaft at a center thereof, and having a plurality of first flux barrier groups arranged in a circumferential direction of the shaft hole and spacing from each other; and a second core having a receiving hole larger than the shaft hole of the first core for receiving the rotation shaft and a part of the compression unit, and stacked at one side of the first core in an axial line direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a synchronous reluctance motor and a compressor having the same according to a first embodiment of the present invention will be explained in more detail.

As shown in FIGS. 2 to 5, the compressor having a synchronous reluctance motor according to the present invention comprises: a case 110 having a receiving space therein; a compression unit 121 arranged in the case 110, for compressing a refrigerant; and a synchronous reluctance motor 131 arranged at one side of the compression unit 121, for providing a driving force to the compression unit 121.

Figure 2:
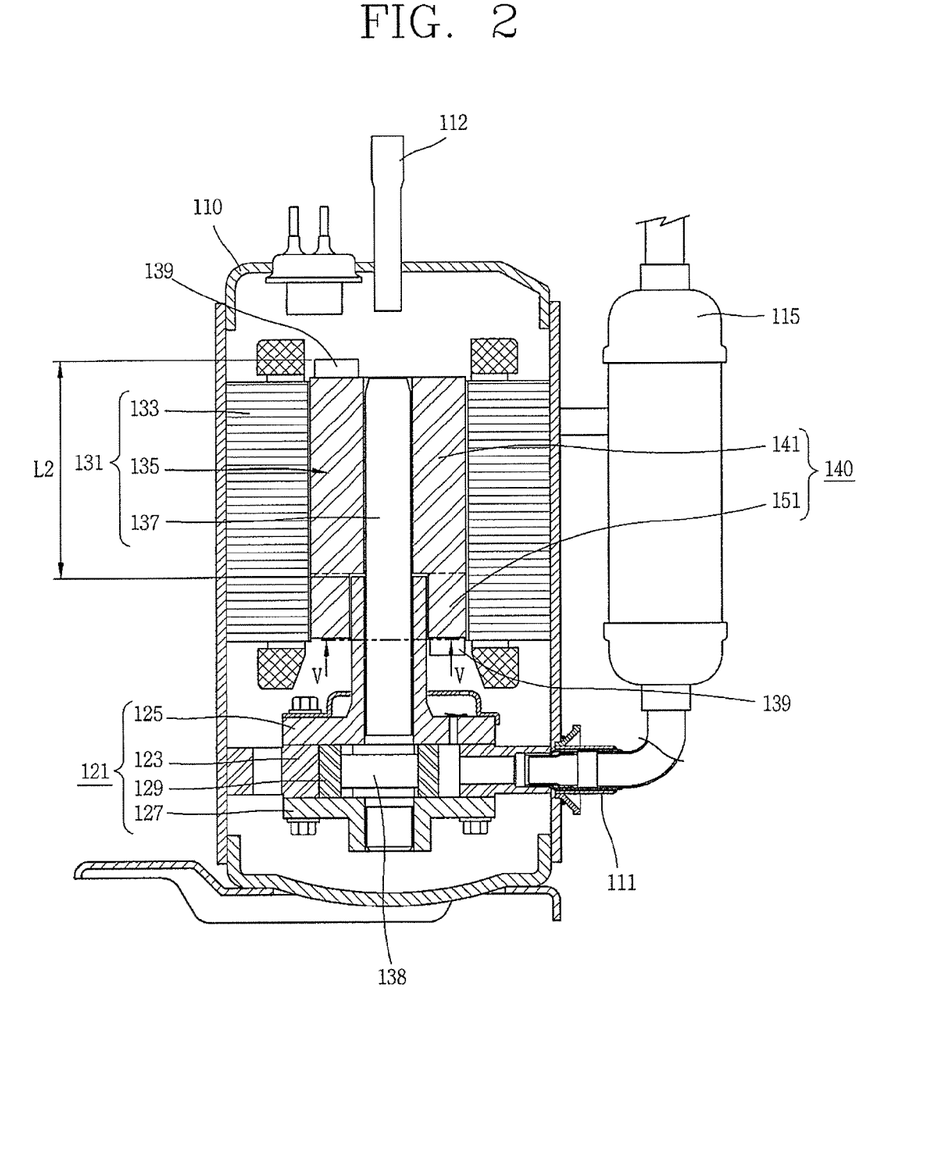
FIG. 2 is a longitudinal section view showing a compressor having a synchronous reluctance motor according to a first embodiment of the present invention.

A suction pipe 111 for sucking a fluid and a discharge pipe 112 for discharging a fluid are coupled to a side surface and an upper end of the case 110, respectively. An accumulator 115 for separating gas and liquid from each other is connected to the suction pipe 111.

The compression unit 121 comprises a cylinder 123 having a compression space therein; an upper bearing member 125 and a lower bearing member 127 coupled to an upper surface and a lower surface of the cylinder 123, respectively; and a roller 129 arranged in the cylinder 123 so as to be eccentrically movable, and orbited along an inner surface of the cylinder 123, for sucking and compressing a fluid. The compression unit 121 is implemented as a rotary compressor. However, the compression unit 121 can be implemented as a scroll compressor having a fixed scroll and an orbit scroll.

The synchronous reluctance motor 131 comprises a stator 133 fixed to inside of the case 110, and a rotor 135 arranged so as to be rotatable with respect to the stator 133. The rotor 135 comprises a rotation shaft 137 having an eccentric portion 138 at a lower portion thereof; a first core 141 having a shaft hole 143 for inserting the rotation shaft 137; and a second core 151 having a receiving hole 153 larger than the shaft hole 143 for receiving the rotation shaft 137, and integrally coupled to the first core 141 in an axial line direction.

Figure 3:
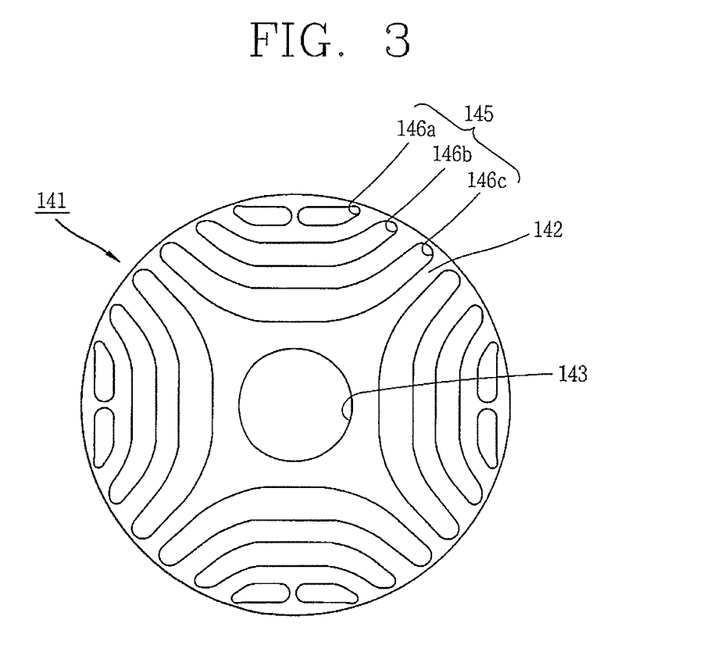
FIG. 3 is a planar view showing a first core of the synchronous reluctance motor of FIG. 2.

The first core 141 is implemented accordingly as a plurality of first steel plates 142 are insulation-stacked to each other. The first steel plate 142 is provided with the shaft hole 143 at a center thereof, and is provided with a plurality of first flux barrier groups 145 formed along a circumferential direction of the shaft hole 143 and spacing from each other. The first flux barrier group comprises first to third slots 146a~146c penetratingly-formed towards the shaft hole 143 from a circumference of the first core with a gap therebetween. The first slot 146a is implemented as one pair each having one end adjacent to the circumference of the first steel plate 142. The second slot 146b is penetratingly-formed at an inner side of the first slot 146a along a radius direction of the first steel plate 142, and has an arc shape. The second slot 146b is formed so that both ends thereof may be adjacent to the circumference of the first steel plate 142. The third slot 146c is penetratingly-formed at an inner side of the second slot 146b, and has an arc shape. The third slot 146c is formed so that both ends thereof may be adjacent to the circumference of the first steel plate 142.

Figure 4:
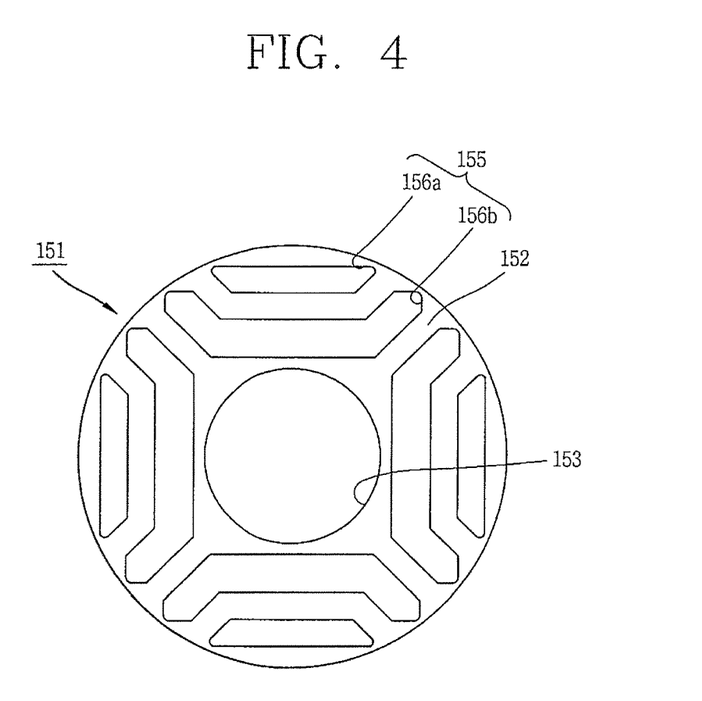
FIG. 4 is a planar view showing a second core of the synchronous reluctance motor of FIG. 2.
Figure 5:
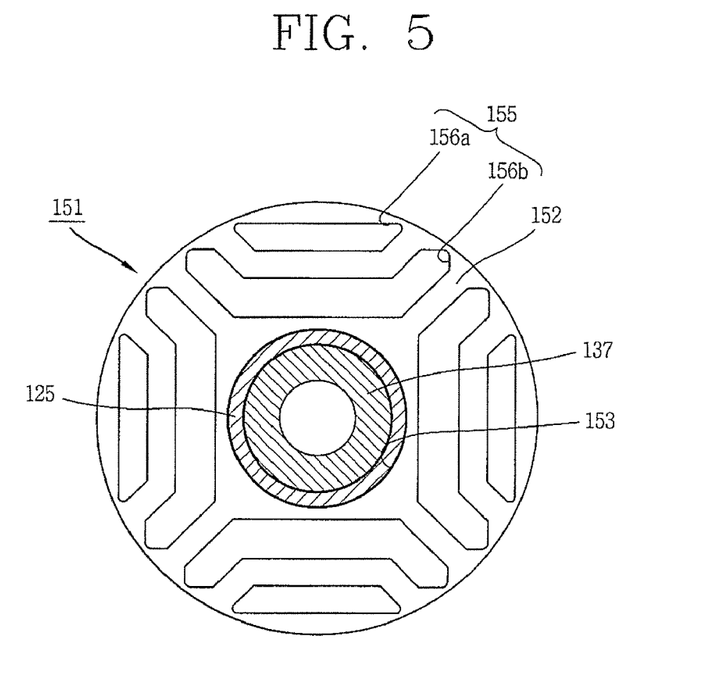
FIG. 5 is a sectional view taken along line 'V-V' of FIG. 2.

The second core 151 is formed accordingly as a plurality of second steel plates 152 are insulation-stacked to each other. The second steel plate 152 is provided with a receiving hole 153 larger than the shaft hole 143 of the first core at a center thereof, the receiving hole 153 for relative-rotatably receiving an upper portion of the upper bearing member 125. The second steel plate 152 is also provided with a plurality of second flux barrier groups 155 formed along a circumferential direction of the receiving hole 153 and spacing from each other. The second flux barrier group 155 comprise a linear first slot 156a having both ends adjacent to the circumference of the second steel plate 151, and a curved second slot 156b. The second slot 156b is arranged at an inner side of the first slot 156a along a radius direction of the second steel plate 152, and is formed so that both ends thereof may be adjacent to the circumference of the second steel plate 152. The second steel plate 152 is formed to have the same diameter and thickness as those of the first steel plate 142.

A balance weight 139 is coupled to an upper end of the first core 141 and a lower end of the second core 151, respectively so as to face each other at the time of a plane projection.

The roller 129 is coupled to the eccentric portion 138 of the rotation shaft 137. Then, the upper bearing member 125 and the lower bearing member 127 are coupled to the cylinder 123 in which the roller 129 is received. Then, the first core 141 and the second core 151 are coupled to each other along an axial line direction, thereby forming the rotor core 140. When the rotor core 140 is coupled to an upper end of the rotation shaft 137, an upper portion of the upper bearing member 125 is received in the receiving hole 153 of the second core 151. Accordingly, a length L2 extending from the upper end of the upper bearing member 125 along the axial line direction can be reduced, thereby enhancing a reliability of the motor when rotated.

Figure 6:
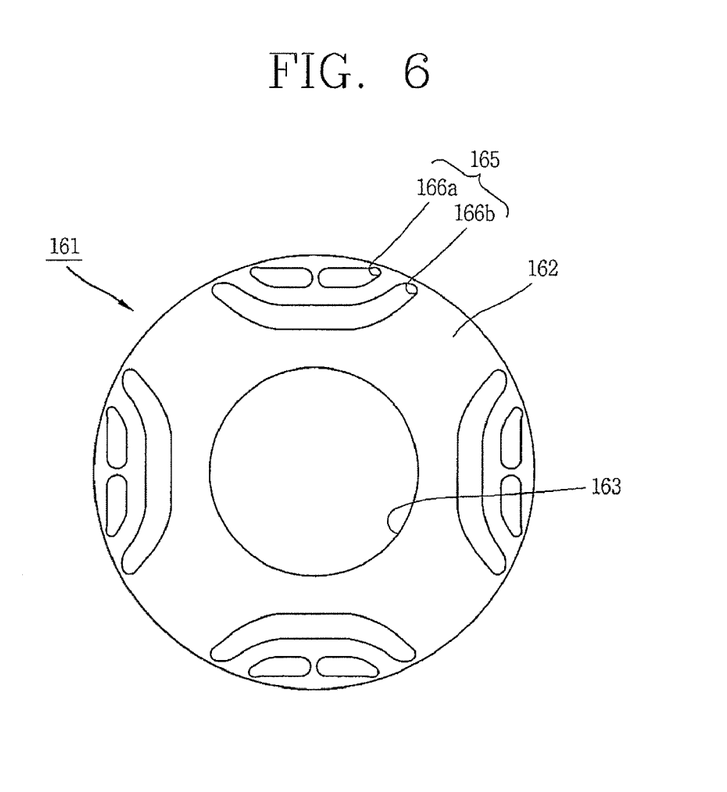
FIG. 6 is a planar view showing a second core of a compressor having a synchronous reluctance motor according to a second embodiment of the present invention.

FIG. 6 is a planar view showing a second core of a compressor having a synchronous reluctance motor according to a second embodiment of the present invention. The same reference numerals will be given to the same parts as those of the first embodiment, and thus their detailed explanation will be omitted. The compressor having a synchronous reluctance motor according to the second embodiment of the present invention comprises a case 110 having a receiving space therein; a compression unit 121 arranged in the case 110, for compressing a refrigerant; and a synchronous reluctance motor 131 arranged at one side of the compression unit 121, for providing a driving force to the compression unit 121.

The synchronous reluctance motor 131 comprises a stator 133 fixed to inside of the case 110, and a rotor 135 arranged so as to be rotatable with respect to the stator 133. The rotor 135 comprises a rotation shaft 137 having an eccentric portion 138 at a lower portion thereof; a first core 141 having a shaft hole 143 for inserting the rotation shaft 137 at a center thereof, and having first to third slots 146a~146c along a circumferential direction of the shaft hole 143; and a second core 161 integrally coupled to the first core 141 in an axial line direction, and having a receiving hole 163 larger than the shaft hole 143 for receiving the rotation shaft 137.

The second core 161 is formed accordingly as a plurality of second steel plates 162 are insulation-stacked to each other. The second steel plate 162 is provided with a receiving hole 163 at a center thereof, and is provided with a plurality of second flux barrier groups 165 each group having a first slot 166a and a second slot 166b. The first slot 166a and the second slot 166b are connected to each other, and have the same size and shape as those of the first slot 146a and the second slot 146b.

Figure 7:
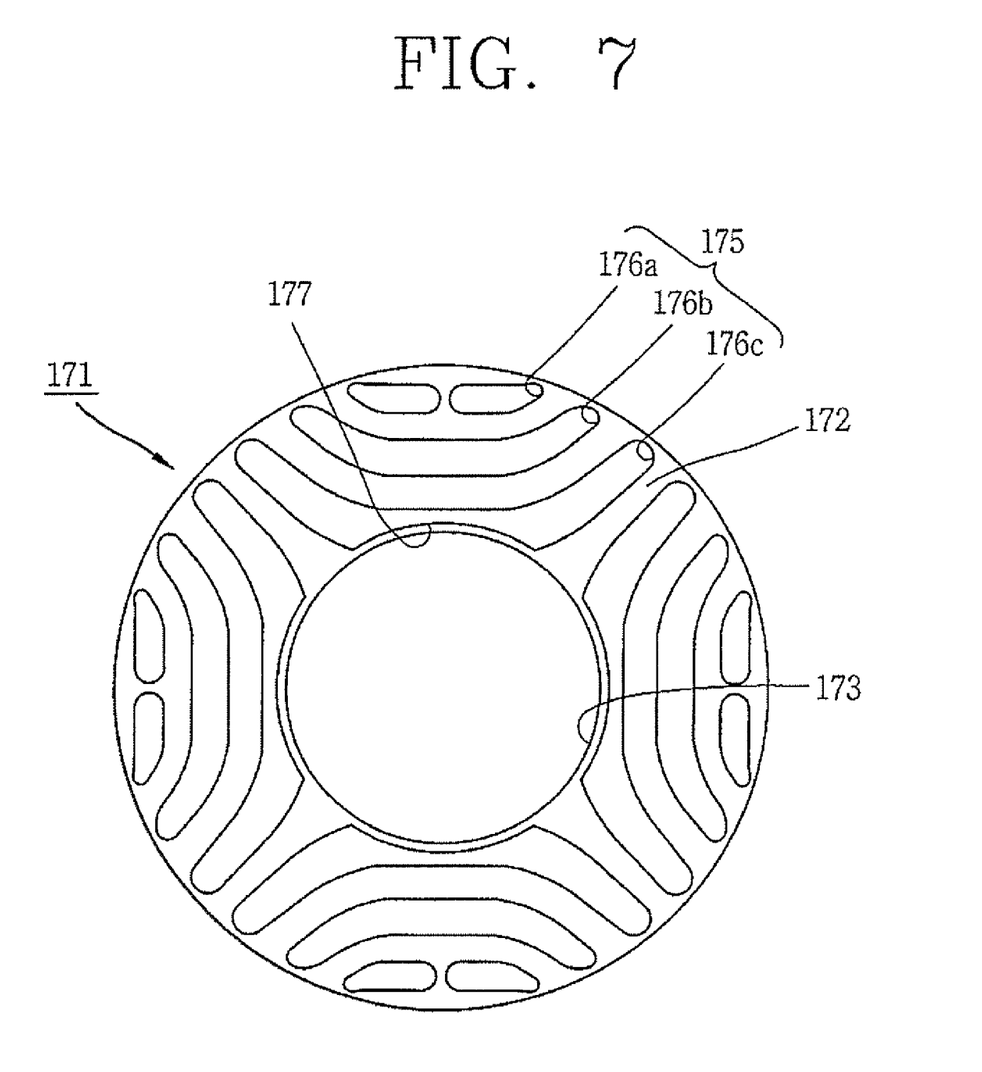
FIG. 7 is a planar view showing a second core of a compressor having a synchronous reluctance motor according to a third embodiment of the present invention.

FIG. 7 is a planar view showing a second core of a compressor having a synchronous reluctance motor according to a third embodiment of the present invention.

The compressor having a synchronous reluctance motor according to the third embodiment of the present invention comprises a case 110 having a receiving space therein; a compression unit 121 arranged in the case 110, for compressing a refrigerant; and a synchronous reluctance motor 131 arranged at one side of the compression unit 121, for providing a driving force to the compression unit 121.

The synchronous reluctance motor 131 comprises a stator 133 fixed to inside of the case 110, and a rotor 135 arranged so as to be rotatable with respect to the stator 133. The rotor 135 comprises a rotation shaft 137 having an eccentric portion 138 at a lower portion thereof; a first core 141 having a shaft hole 143 for inserting the rotation shaft 137 at a center thereof, and having first to third slots 146a~146c at a circumferential direction thereof; and a second core 171 integrally coupled to the first core 141 in an axial line direction, and having a receiving hole 173 larger than the shaft hole 143 for receiving the rotation shaft 137.

The second core 171 is provided with a receiving hole 173 at a center thereof, and is provided with first to third slots 176a~176c along a circumferential direction of the receiving hole 173. The first to third slots 176a~176c are connected to one another, and have the same size and shape as those of the first to third slots 146a~146c of the first core 141. A concaved portion 177 is formed at the third slot 176c so as to be outwardly concaved in correspondence with the receiving hole 173. Accordingly, the fabrication of the second core 171 is facilitated, and an output, that is, a torque is enhanced.

As aforementioned, in the synchronous reluctance motor according to the present invention, the length of the rotor protruding from the supporting portion can be decreased without reducing a stacked thickness thereof. Accordingly, a vibration occurrence in a horizontal direction with respect to the axial line when the motor is rotated can be reduced, thereby enhancing a reliability of the synchronous reluctance motor.

Furthermore, in the compressor having the synchronous reluctance motor according to the present invention, the rotor is constructed to have the receiving hole for receiving the rotation shaft and a part of the compression unit. Accordingly, the length of the rotor protruding from the supporting portion such as the upper bearing member, etc. can be decreased without reducing a stacked thickness of the rotor. Accordingly, a vibration occurrence in a horizontal direction with respect to the axial line when the motor is rotated can be reduced, thereby enhancing a reliability of the synchronous reluctance motor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A synchronous reluctance motor, comprising:
a stator; and
a rotor, wherein the rotor comprises:
a rotation shaft;
a first core having a shaft hole for inserting the rotation shaft at a center thereof, and having a plurality of first flux barrier groups arranged along a circumferential direction of the shaft hole and spaced from each other; and
a second core having a receiving hole larger than the shaft hole, the receiving hole and the shaft hole having substantially a same center, and stacked at one side of the first core in an axial line direction, the second core having a plurality of second flux barrier groups arranged along a circumferential direction of the shaft hole and spaced from each other,
wherein each of the first flux barrier groups comprises a plurality of slots arranged towards the shaft hole from a circumference of the first core with a gap therebetween, and
wherein each of the second flux barrier groups comprises a plurality of slots arranged towards the receiving hole from a circumference of the second core with a gap therebetween, and
wherein at least one slot adjacent to the shaft hole among the plurality of slots in each first flux barrier group overlaps in the axial line direction the receiving hole of the second core.

2. The synchronous reluctance motor of claim 1, wherein a number of slots of each of the second flux barrier groups is less than a number of slots of each of the first flux barrier groups.

3. The synchronous reluctance motor of claim 2, wherein each slot of the second flux barrier group is formed to be greater than each slot of the first flux barrier group.

4. The synchronous reluctance motor of claim 2, wherein each slot of the first flux barrier group has substantially a same size and shape as each slot of the second flux barrier group.

5. The synchronous reluctance motor of claim 1, wherein each slot adjacent to the receiving hole, among the slots of the second flux barrier group, comprises a concave portion outwardly concave relative to the receiving hole.

6. The synchronous reluctance motor of claim 5, wherein a number of slots of the second flux barrier group is equal to a number of slots of the first flux barrier group.

7. The synchronous reluctance motor of claim 1, wherein the slot arrangement of the first flux barrier groups in the first core is different from the slot arrangement of the second flux barrier groups in the second core, said different slot arrangements producing different patterns of magnetic flux.

8. A synchronous reluctance motor, comprising:
a stator; and
a rotor, wherein the rotor comprises:
a rotation shaft;
a first core having a shaft hole for inserting the rotation shaft at a center thereof, and having a plurality of first flux barrier groups arranged along a circumferential direction of the shaft hole and spaced from each other; and
a second core having a receiving hole larger than the shaft hole, the receiving hole and the shaft hole having substantially a same center and stacked at one side of the first core in an axial line direction, the second core having a plurality of second flux barrier groups arranged along a circumferential direction of the shaft hole and spaced from each other,
wherein each of the first flux barrier groups comprises a plurality of slots arranged towards the shaft hole from a circumference of the first core with a gap therebetween, wherein each of the second flux barrier groups comprises a plurality of slots arranged towards the receiving hole from a circumference of the second core with a gap therebetween, and wherein a shortest distance from the center of the receiving hole to adjacent slots of the second flux barrier groups is greater than a shortest distance from the center of the shaft hole to adjacent slots of the first flux barrier groups.

9. The synchronous reluctance motor of claim 8, wherein a number of slots of the second flux barrier group is less than a number of slots of the first flux barrier group.

10. The synchronous reluctance motor of claim 9, wherein each slot of the second flux barrier group is fo iiied to be greater than each slot of the first flux barrier group.

11. The synchronous reluctance motor of claim 9, wherein each slot of the first flux barrier group has substantially a same size and shape as each slot of the second flux barrier group.

12. The synchronous reluctance motor of claim 8, wherein each slot adjacent to the receiving hole, among the slots of the second flux barrier group, comprises a concave portion outwardly concave relative to the receiving hole.

13. The synchronous reluctance motor of claim 12, wherein a number of slots of the second flux barrier group is equal to a number of slots of the first flux barrier group.

14. The synchronous reluctance motor of claim 8, wherein the slot arrangement of the first flux barrier groups in the first core is different from the slot arrangement of the second flux barrier groups in the second core, said different slot arrangements producing different patterns of magnetic flux.

15. A compressor having a synchronous reluctance motor, comprising:
a case;
a compression unit received in the case for compressing a fluid; and
a synchronous reluctance motor comprising a stator and a rotor rotatably coupled to the stator, wherein the rotor comprises:
a rotation shaft;
a first core having a shaft hole for inserting the rotation shaft at a center thereof, and having a plurality of first flux barrier groups arranged along a circumferential direction of the shaft hole and spaced from each other; and
a second core having a receiving hole larger than the shaft hole, the receiving hole and the shaft hole having substantially a same center and stacked at one side of the first core in an axial line direction, the second core having a plurality of second flux barrier groups arranged along a circumferential direction of the shaft hole and spaced from each other,
wherein each of the first flux barrier groups comprises a plurality of slots arranged towards the shaft hole from a circumference of the first core with a gap therebetween,
wherein each of the second flux barrier groups comprises a plurality of slots arranged towards the receiving hole from a circumference of the second core with a gap therebetween, and
wherein at least one slot adjacent to the shaft hole among the plurality of slots in each first flux barrier group overlaps in the axial line direction the receiving hole of the second core.

16. The compressor of claim 15, wherein a number of slots of each of the second flux barrier groups is less than a number of slots of each of the first flux barrier groups.

17. The compressor of claim 16, wherein each slot of the second flux barrier group is formed to be greater than each slot of the first flux barrier group.

18. The compressor of claim 16, wherein each slot of the first flux barrier group has substantially a same size and shape as each slot of the second flux barrier group.

19. The compressor of claim 15, wherein each slot adjacent to the receiving hole, among the slots of the second flux barrier group, comprises a concave portion outwardly concave relative to the receiving hole.

20. The compressor of claim 19, wherein a number of slots of the second flux barrier group is equal to a number of slots of the first flux barrier group.

21. The compressor of claim 15, wherein the slot arrangement of the first flux barrier groups in the first core is different from the slot arrangement of the second flux barrier groups in the second core, said different slot arrangements producing different patterns of magnetic flux.

22. A compressor having a synchronous reluctance motor, comprising:
a case;
a compression unit received in the case for compressing a fluid; and
a synchronous reluctance motor comprising a stator and a rotor rotatably coupled to the stator, wherein the rotor comprises:
a first core having a shaft hole for inserting the rotation shaft at a center thereof, and having a plurality of first flux barrier groups arranged along a circumferential direction of the shaft hole and spaced from each other; and
a second core having a receiving hole larger than the shaft hole, the receiving hole and the shaft hole having substantially a same center and stacked at one side of the first core in an axial line direction, the second core having a plurality of second flux barrier groups arranged along a circumferential direction of the shaft hole and spaced from each other,
wherein each of the first flux barrier groups comprises a plurality of slots arranged towards the shaft hole from a circumference of the first core with a gap therebetween,
wherein each of the second flux barrier groups comprises a plurality of slots arranged towards the receiving hole from a circumference of the second core with a gap therebetween, and
wherein a shortest distance from the center of the receiving hole to adjacent slots of the second flux barrier groups is greater than a shortest distance from the center of the shaft hole to adjacent slots of the first flux barrier groups.

23. The compressor of claim 22, wherein a number of slots of the second flux barrier group is less than a number of slots of the first flux barrier group.

24. The compressor of claim 23, wherein each slot of the second flux barrier group is formed to be greater than each slot of the first flux barrier group.

25. The compressor of claim 23, wherein each slot of the first flux barrier group has substantially a same size and shape as each slot of the second flux barrier group.

26. The compressor of claim 22, wherein each slot adjacent to the receiving hole, among the slots of the second flux barrier group, comprises a concave portion outwardly concave relative to the receiving hole.

27. The compressor of claim 26, wherein a number of slots of the second flux barrier group is equal to a number of slots of the first flux barrier group.

28. The compressor of claim 22, wherein the slot arrangement of the first flux barrier groups in the first core is different from the slot arrangement of the second flux barrier groups in the second core, said different slot arrangements producing different patterns of magnetic flux.

* * * * *